(12) United States Patent
Acciari et al.

(10) Patent No.: US 12,042,949 B2
(45) Date of Patent: Jul. 23, 2024

(54) WINDING MACHINE WITH AN EVALUATION SYSTEM OF THE WEB MATERIAL BEING PROCESSED AND METHOD

(71) Applicant: ITALIA TECHNOLOGY ALLIANCE S.R.L., Bologna (IT)

(72) Inventors: Giuseppe Acciari, Bologna (IT); Fernando Barsacchi, Bologna (IT); Filippo Gelli, Bologna (IT)

(73) Assignee: ITALIA TECHNOLOGY ALLIANCE S.R.L., Bologna (IT)

( * ) Notice: Subject to any disclaimer, the term of this patent is extended or adjusted under 35 U.S.C. 154(b) by 637 days.

(21) Appl. No.: 17/285,613

(22) PCT Filed: Oct. 15, 2019

(86) PCT No.: PCT/IB2019/058762
§ 371 (c)(1),
(2) Date: Apr. 15, 2021

(87) PCT Pub. No.: WO2020/079576
PCT Pub. Date: Apr. 23, 2020

(65) Prior Publication Data
US 2021/0394386 A1 Dec. 23, 2021

(30) Foreign Application Priority Data
Oct. 16, 2018 (IT) .................. 102018000009481

(51) Int. Cl.
*B65H 23/18* (2006.01)
*B26D 7/26* (2006.01)
*B65H 23/195* (2006.01)

(52) U.S. Cl.
CPC ......... *B26D 7/2621* (2013.01); *B26D 7/2635* (2013.01); *B65H 23/1955* (2013.01); *B65H 2301/4148* (2013.01); *B65H 2511/413* (2013.01)

(58) Field of Classification Search
CPC .... B26D 7/2621; B26D 7/2635; B65H 18/16; B65H 23/1955; B65H 23/1825; B65H 2301/4148; B65H 2511/413
See application file for complete search history.

(56) References Cited

U.S. PATENT DOCUMENTS 4,342,432 A * 8/1982 Lund .................. B65H 23/1806
242/530.4
5,474,248 A  12/1995 Bradshaw et al.
(Continued)

FOREIGN PATENT DOCUMENTS

EP 1245354 A1 10/2002
EP 1245519 A1 10/2002
(Continued)

*Primary Examiner* — Sang K Kim
(74) *Attorney, Agent, or Firm* — McGlew and Tuttle, P.C.

(57) ABSTRACT

The machine (1; 100) comprises a winding station (3; 101), adapted to receive secondary winding cores (T) coaxial with, and adjacent to, one another. A cutting device (11; 104) is also provided, with a plurality of blades (13; 105), arranged upstream of the winding station (3; 101) with respect to the feeding direction of the web material (N) and adapted to subdivide the web material into plurality of strips (S1-S5) of web material; The machine has a web material evaluation system and a programmable unit (71) for processing data collected by the web material evaluation system.

18 Claims, 8 Drawing Sheets

(56) References Cited

U.S. PATENT DOCUMENTS

| | | | |
|---|---|---|---|
| 6,655,629 B1 | 12/2003 | Acciari | |
| 8,096,948 B2 | 1/2012 | Schreckenberg et al. | |
| 11,124,379 B2 * | 9/2021 | Kashu | H01M 10/0525 |
| 2008/0148914 A1 | 6/2008 | Micheli | |
| 2014/0061358 A1 * | 3/2014 | Fohr | B65H 35/02 |
| | | | 242/525.1 |
| 2017/0066614 A1 * | 3/2017 | Allen | B31D 1/0062 |

FOREIGN PATENT DOCUMENTS

| | | | |
|---|---|---|---|
| EP | 1652805 A1 | 5/2006 | |
| EP | 2319787 A2 | 5/2011 | |
| JP | 2003276919 A | 10/2003 | |
| WO | 9628284 A1 | 9/1996 | |
| WO | 9628285 A1 | 9/1996 | |

* cited by examiner

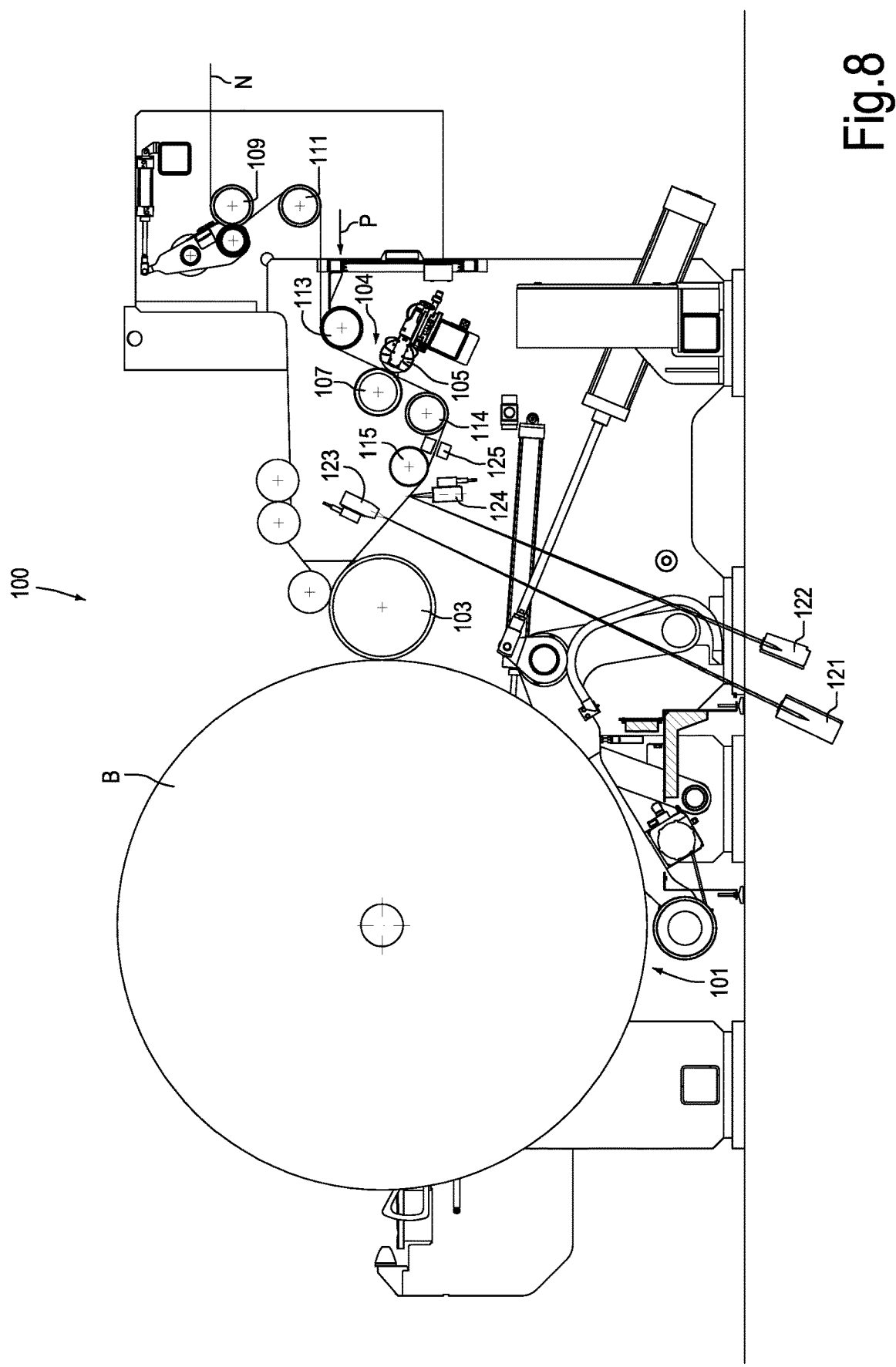

WINDING MACHINE WITH AN EVALUATION SYSTEM OF THE WEB MATERIAL BEING PROCESSED AND METHOD

TECHNICAL FIELD

The present invention relates to improvements to the winding machines, in particular to winders or rewinders provided with cutting members which slit the fed web material into longitudinal strips to produce in parallel a plurality of reels of wound material having axial dimension smaller than the width of the web material entering the machine. In particular, embodiments disclosed herein relate to so-called slitter-rewinders. Especially, the invention relates to improvements to rewinding or winding machines which cut a web material coming from a primary reel or a production machine, slitting it into a plurality of longitudinal strips wound into secondary reels.

The invention also relates to improvements to the methods for winding or rewinding a web material, coming from a primary reel or a production machine, into secondary reels, each formed by a respective strip into which the web material from the primary reel has been slit.

BACKGROUND ART

In many industrial sectors web materials are produced, i.e. thin materials, which are wound into primary reels, also called parent reels or master rolls. To produce packages of web material intended for subsequent use, the web material of the primary reels is unwound and rewound into reels or rolls of smaller diameter by means of rewinding processes and methods. In some cases, during rewinding the web material is also slit into a plurality of adjacent longitudinal strips by means of a cutting device comprising a plurality of blades or knives, typically of discoid shape. In this way, the rewinder directly forms reels of small axial dimension. The rewinders comprising, to this end, longitudinal cutting devices are also referred to as slitter-rewinders or rewinder-slitters. Embodiments disclosed below relate to this type of machines.

These rewinders are used in plants or lines for processing plies of non-woven fabric, paper and the like. These materials, rewound into secondary reels, can be used as semi-finished products for subsequent production cycles in so-called converting lines. Typically, secondary reels of non-woven fabric are used to feed converting machines for the production of baby diapers, sanitary napkins, incontinence pads and similar products. These machines are very complex, require high quality reels and do not allow the use of defected materials, in particular in consideration of the final use for which the articles are intended.

In the specific sector of non-woven fabrics, but also in similar sectors, for example in the paper sector, the primary reels can be formed by machines called "winders" or "winding machines", fed by a web material forming line.

The use is known of vision systems and/or metal detectors, installed at the end of the non-woven production line, before the winder. These systems control the quality of the formed web material before it is wound into primary reels.

In particular, these vision systems or metal detectors give information on the presence of: holes; fiber lumps; plastic molten in the web material; insects trapped in the web material; oil stains; dirt stains; creases; tears; metal contamination; material other than the raw material; production quality of the web material (thickness uniformity).

The vision systems, together with a measurement system in machine direction, i.e. in the web material feeding direction, installed on the winder, generate a map of defects in the primary reel, indicating, for each defect, the coordinates thereof in machine direction (MD) and cross direction (CD). The operator can remove the defects from the web material when the primary reel is unwound and wound again by means of the rewinder during the rewinding step.

These quality control systems have some limits as regards defect localization and, thus, in terms of defect removal efficiency. Especially, these systems cannot take into account the changes in dimension, to which the web material is subjected during the rewinding step. This can result in incorrect localization of defects in the produced secondary reels. Furthermore, the prior art systems are not adapted to detect (and thus discard) defects made in the working steps following the primary reel production.

Moreover, the known systems do not allow for the detection of some characteristics of the web material resulting from mechanical actions (cutting, traction, rewinding) performed after winding into primary reels.

Namely, one of the features of the rewinder is to wind secondary reels comprised of strips of constant width and with end surfaces as flat as possible. This is required by the user of the secondary reels as, during the following working steps (converting) it is necessary to have available reels with a strip of constant width and with the edges of the strip remaining always in the same position also when the diameter of the reel being unwound changes. The strip width mainly depends on the mechanical features of the web material and on the tension thereof in the point of longitudinal cut and in the point of winding of the rewinder.

The prior art rewinders do not allow adequate control of these features during the rewinding step.

There is therefore the need for providing more efficient rewinders and rewinding methods, that limit or overcome one or more of the drawbacks of the prior art machines and methods.

SUMMARY

According to a first aspect, a rewinding machine, or rewinder, is provided for winding a web material into a plurality of secondary reels, comprising a winding station, with a winding cradle adapted to receive secondary winding cores that are adjacent to, and coaxial with, one another. Within the present description and the attached claims, the term "rewinder" refers to a machine receiving a continuous web material and winding it into a plurality of reels. A rewinding machine can be a machine receiving a continuous web material from a primary reel and rewinding it into secondary reels, after having cut it into longitudinal strips.

In the embodiments disclosed herein, the winding machine or rewinding machine comprises a cutting device with a plurality of blades, which is arranged upstream of the winding cradle with respect to the web material feeding direction. The cutting device is adapted to cut the web material entering the machine into a plurality of strips of web material, each of which will form a respective secondary reel. Characteristically, the winder or rewinder also comprises an evaluation system for evaluating the web material.

In particular, in a rewinder, the evaluation system is arranged along the feeding path of the web material coming from a primary reel and supplied to the winding cradle.

Within the present description and the attached claims, the term web material evaluation system refers to any system adapted to detect or to acquire one or more qualitative or quantitative features of the web material, before or, preferably after the web material has been divided into longitudinal strips by means of the cutting device.

Within the present description and the attached claims, the term features of the web material may refer, in general, to structural and material features, including defects of the web material, such as stains, tears, holes, creases, lumps, foreign materials, changes in thickness, etc. Features of the material may also refer to dimensional features of the web material, in particular width in cross direction, i.e. orthogonally to the feeding direction, of the web material and/or of the strips, into which it has been subdivided. Features of the material may also refer to positional features, in particular relative or absolute position of the longitudinal edges of the web material or of the strips, into which is has been divided, with respect to the winding members. Knowing these features, and, if necessary, correcting them during the winding step, may be useful to increase the quality of the produced secondary reels.

The winding cradle may comprise peripheral winding members. Peripheral winding members refer to motorized members, such as roller, belts or a combination thereof, transmitting a rotation torque to the secondary reels being formed in the winding cradle by the effect of the surface friction between the cylindrical surface of the secondary reels and the winding member. The winding cradle can also comprise central winding members, i.e. members transmitting the winding motion through a shaft or rod or a pair of tailstocks engaging the tubular winding cores and/or winding rods or shafts, on which the tubular winding cores are locked. In some embodiments, the winding cradle may comprise a combination of peripheral winding members and central winding members.

In particularly advantageous embodiments, the winding cradle comprises a pair of motorized winding rollers, adjacent to each other, whose respective rotation axes lie on a preferably horizontal plane. The tubular winding cores rest in the nip defined between the two winding rollers. The strips of web material to be wound onto the single winding core are driven around one of said winding rollers.

The web material evaluation system may comprise a system for capturing images of the web material, for example a video system comprising one or more video cameras for capturing images of the moving web material in fast sequence. The images may be processed to acquire information on defects of various kind or other features in the web material, such as creases, tears, holes, presence of foreign material, etc. The video cameras may be arranged in fixed position with respect to a stationary structure of the winder or rewinder, and may be of such a number and/or range to capture an image of the whole width of the web material. The video cameras can be based on the reflection or transmission system, as described below with reference to some embodiments.

The images acquired by the video cameras may be also used for determining the width of the web material and/or of the strips, into which it has been divided, or the position of the longitudinal edges of the strips, for purposes that will be explained below. The position of the edges of the strips and/or the cross dimensions of the strips or of the web material before it has been divided into strips, may be acquired also by means of systems other than video cameras, as it will be explained below.

In some embodiments, video cameras based on the reflection system can be particularly advantageous. In case of reflective video cameras, the video camera and the respective lighting system for lighting the web material framed by the video camera are arranged on the same side of the web material feeding path. In this way, the video camera may be arranged so as to take images of the web material in an area where it rests on a guide roller or a guide plate, or on a winding roller, for example. In this case, the web material is not subjected to oscillations or waving due to aerodynamic effects that could make it difficult to take and/or to process images in order to acquire useful information.

In some embodiments, the web material evaluation system comprises a system adapted to detect the width of at least one portion (e.g. one strip) of the web material. The system adapted to detect the width of at least one portion of the web material may use one or more video cameras (based on transmission and/or reflection system), framing the web material in a point of the feeding path thereof. The system for detecting the width of the web material may be based on acquisition apparatuses other than the vision systems, as described below in greater details.

If the web material evaluation system comprises video cameras, a camera can be provided in a given position of the web material feeding path, framing the whole width of the web material. In other embodiments, a linear matrix of cameras can be provided, all aligned along the cross direction with respect to the feeding path. In further embodiments, cameras can be for example used with a limited range (for instance: 1/20 of the whole width of the web material), and the camera(s) can be provided with a cross motion with respect to the web material feeding direction, if this is compatible with the type of information to be acquired. For example, if information should be acquired on the width and/or the cross position of the longitudinal edges of the web material before and/or after the cutting thereof into strips, and if this information does not need to be instantaneous, as it is sufficient to detect slow changes thereof over time, it is not necessary to acquire continuously images of the web material on the whole width thereof.

If the video camera(s) can move in cross direction, an encoder or other system can be associated therewith for detecting the absolute cross position thereof, i.e. the position relative to the fixed structure of the rewinder, so that the programmable control unit receiving the images taken by the camera is also able to associate each image to a given cross position with respect to the width of the web material.

In further embodiments, for detecting the width of the web material or of a portion thereof, for example one or more longitudinal strips into which the web material has been cut, a laser photocell may be provided, adapted to read the presence of the web material, mounted on a linear actuator provided with a system for detecting the achieved position, adapted to transport the photocell in cross direction. This photocell gives an on-off signal based on the presence or absence of the web material in the position in which the photocell is located. By interfacing the signal of the system for reading the photocell position in cross direction and the on/off signal of the photocell, it is possible to calculate the width of the strips and the reciprocal distance between longitudinal edges of adjacent strips due to the transverse contraction of the strips of web material caused by the traction exerted thereon (so-called neck-in, better explained below).

In further embodiments, the system adapted to detect the width of the web material may comprise a laser scanner for reading the whole width of the web material and then outputting data on the width of the strips of web material and on the reciprocal distance therebetween.

The width of the web material or of a portion thereof can be determined also by means of a device emitting electrostatic charges, arranged on a side of the web material feeding path, together with a grounding system, installed on the opposite side of the web material feeding path, in front of the electrostatic charges emitting device.

In particularly advantageous embodiments, the web material evaluation system is arranged in an area of the web material feeding path comprised between the cutting device and the winding cradle. In this way it is possible to evaluate one or more features of the web material after it has been cut into longitudinal strips. It is also possible to obtain information on each individual strip and, therefore, on each individual secondary reel formed by means of the winder or rewinder. In particular, it is possible to identify any defects in the web material caused by cutting. Furthermore, by arranging the web material evaluation system downstream of the cutting device it is possible to detect with greater precision the position of singularities, defects or generic features of the web material in one or the other of a plurality of secondary reels produced with a web material coming from a single primary reel.

By arranging the web material evaluation system downstream of the cutting device, it is possible to read the transverse dimension of the individual strips and the mutual distance between longitudinal edges of adjacent strips, and, thus, to evaluate the neck-in phenomenon as described in greater detail below.

It is particularly advantageous to arrange the web material evaluation system in an area of the feeding path comprised between a winding roller of the winding cradle and a guide roller located directly upstream of the winding roller. The term "directly upstream" means that between the guide roller and the winding roller there are no further mechanical members, which could modify one or more features of the web material, such as the longitudinal tension, or which could introduce defects in the web material. In this way the information acquired is exactly that of the web material as it is wound into the respective secondary reel.

In some embodiments, the web material evaluation system comprises an arrangement for measuring the Poisson's ratio of the web material. The Poisson's ratio, or ratio of transverse strain, is a temperature-dependent coefficient that measures the transverse expansion and contraction of a material subjected to a longitudinal unidirectional stress.

The Poisson's ratio measurement arrangement may comprise, in combination: a first measurement device for measuring a first feeding speed of the web material in a first position along the feeding path of the web material towards the winding cradle; a second measurement device for measuring a second feeding speed of the web material in a second position along the feeding path of the web material towards the winding cradle, downstream of the first position of the feeding path; a first device for acquiring information on a first width of the web material in the first position; a second device for acquiring information on a second width of the web material in the second position.

Knowing the Poisson's ratio of the web material can be useful for many reasons. Firstly, it is a piece of information that could be useful to provide to those who will use the reels for processing them and producing finished or semi-finished products. Knowing the Poisson's ratio can be useful, for example, to adjust the operating parameters of the reel converting lines. Furthermore, in some cases it may be useful to know the Poisson's ratio of the web material in order to modify, control or manage upstream production parameters. This can be useful, for example, for keeping the Poisson's ratio in a desired range of values, thus ensuring constant quality of the product exiting the production machine. By measuring the actual Poisson's ratio, it is possible to act on one or more upstream production parameters, for example in order to reduce or eliminate an error between the measured Poisson's ratio value and the set value.

The winder or rewinder may comprise a programmable unit, for example a PLC, a micro-controller, a computer or any other device provided with processing means and adapted to modulate one or more parameters of at least one web material feeding member, and in particular of a plurality of web material feeding members arranged in sequence along the feeding path. The parameter may be correlated to the feeding speed, for example it may be constituted by the rotation speed of a roller around which the web material is driven, or by means of which it is wound, or by the speed of a winding belt. By adjusting the speed of these members it is possible to adjust the tension of the web material.

The web material tension can be an important parameter, affecting the quality of the second reel and the behavior thereof during the unwinding step and the subsequent converting into finished products. The tension, i.e. the longitudinal traction of the web material (both before and after cutting into strips) causes a transverse contraction of the web material and, thus a change in the width thereof. The web material evaluation system may be adapted to detect the width of one or more strips of web material and/or of the web material before it has been longitudinally cut. According to a position of at least one longitudinal edge of the web material, detected by the web material evaluation system, it is possible to determine the contraction of the web material and thus to modify an operating parameter, for example the speed, of one or more feeding members, in order to modulate the tension, and thus the side contraction, of the web material or a portion thereof (strip). In this way, as it will be described in greater detail below, it is for example possible to improve the quality of the secondary reels, obtaining flat head surfaces or at least to reduce the flatness errors thereof, i.e. the deviation of the actual surface from a perfectly flat theoretical surface.

In the present description and in the attached claims, a feeding member can be understood, in general, any mechanical member adapted to apply a traction force onto the web material. A feeding member can thus be a motorized roller, around which the web material is driven, typically a winding roller of the winding cradle, or a motorized roller along the feeding path upstream of the winding cradle, or a counter-roller of the cutting device dividing the web material into longitudinal strips.

A feeding member may be also a belt or a system of belts of the unwinder that unwinds the primary reels with a peripheral unwinding system, using the torque transmitted by friction to the side surface of the primary reel. Feeding members may also be central rotation members, for example tailstocks axially engaging the primary reel and/or the secondary reel.

In embodiments described herein, the web material evaluation system may also comprise detection members for detecting the presence of metal residues in the web material.

According to a further aspect, a method for rewinding a web material is disclosed, comprising the following steps:
  unwinding a web material from a primary reel;
  feeding the web material along a feeding path from the
    primary reel towards a winding cradle, where a series
    of secondary winding cores is inserted, which are
    coaxial with one another and adjacent to one another;

cutting the web material into a plurality of strips of web material along the feeding path;
winding the strips of web material around the secondary reels;
detecting at least one feature of the web material along the feeding path.

According to a further aspect, a method for winding a web material is disclosed, comprising the following steps:
feeding a web material to a winding machine, for example a winder or a rewinder, along a feeding path towards a winding cradle, where a series of secondary winding cores is inserted, which are coaxial with one another and adjacent to one another;
cutting the web material into a plurality of strips of web material along the feeding path;
winding the strips of web material around the secondary reels;
detecting at least one feature of the web material along the feeding path, downstream of the position where the web material is cut into strips.

For example, the step of detecting at least one feature of the web material may comprise the step of capturing images of at least one face of the web material and preferably of both faces of the web material.

According to advantageous embodiments of the method disclosed herein, the feature of the web material is detected in a portion of the feeding path downstream of a cutting device, which cuts the web material into strips of web material, and preferably directly upstream of the winding cradle.

In some embodiments of the method disclosed herein, the feature of the web material comprises the Poisson's ratio thereof.

In some embodiments, the method may comprise the steps of: detecting a position of at least one longitudinal edge of the web material moving forward along the feeding path; controlling a feeding parameter, for example the feeding speed of the web material, according to the detected position.

The step of controlling a web material feeding parameter may comprise the step of reducing the feeding speed if the longitudinal edge of the web material is shifting laterally. "Laterally shifting" may refer to a lateral shifting beyond a set threshold.

In some embodiments, the method comprises the steps of: detecting at least one parameter correlated to a width of the web material; modulating a tension of the web material according to the detected parameter. The step of modulating the tension may comprise the step of varying the feeding speed of the web material in at least one point of the feeding path and, in particular, modulating the difference between the feeding speeds of the web material in two points of the feeding path.

According to a further aspect, the method may comprise the steps of:
winding at least a first series of secondary reels, each formed by a strip of web material, on respective winding cores of a first series of winding cores arranged in the winding cradle; wherein the strips of web material are formed by cutting by means of a plurality of blades arranged in a first cut position;
while winding the first series of secondary reels, detecting information on the position taken by the edges of the strips of web material and, based on said information, determining the actual width of the strips wound on the secondary reels of the first series and the reciprocal distance between adjacent strips;
removing the first series of secondary reels from the winding cradle;
according to the actual width of the strips and the reciprocal distance between the strips, repositioning the blades in a second cut position so as to take into account the transverse contraction of the strips of web material;
positioning a second series of winding cores in the winding cradle, the cores of the second series being dimensioned and positioned according to the actual width of the strips and to the reciprocal distance between the strips;
winding a second series of secondary reels on the second series of winding cores.

Winding the first series of reels may have the sole purpose of detecting the effective width of the strips in order to reposition the blades before starting production. As the first series of secondary reels can be a waste, they can have a length which is shorter, or much shorter than the reels of the production actually intended for subsequent processing or sale. In other words, the reels of the first series are wound for a length necessary to detect the required data and not for the entire length of the specific batch of reels, which will be actually produced.

Further advantageous features and embodiments of the winding machine, winder or rewinder, and of the method disclosed herein are illustrated in the following description of non-limiting embodiments with reference to the attached drawing, and set forth in the attached claims, which form an integral part of the present description.

BRIEF DESCRIPTION OF THE DRAWING

The invention will be better understood by following the description below and the attached drawing, showing a non-limiting embodiment of the invention. More specifically, in the drawing:
FIG. 8 is a schematic side view of a winder for producing reels of web material coming directly from a production machine.

DETAILED DESCRIPTION OF EMBODIMENTS

In the description below, specific reference will be made to the processing of a web material consisting of a non-woven fabric. However, it is to be understood that this type of material is indicated just by way of a non-limiting example. Aspects of the winding machines, such as winders or rewinders, and of the winding and rewinding methods described herein may also be advantageously applied for rewinding strips of web material other than non-woven fabric, for example plastic film, paper and especially tissue paper or the like.

Specific reference will be made below to particularly advantageous embodiments of rewinding machines and more precisely to slitter-rewinders, and to the related methods for rewinding a web material coming from a primary reel into a plurality of secondary reels, after slitting (cutting) into single longitudinal strips.

Some features and advantages described below with reference to a slitter-rewinder and the related rewinding method can be advantageously applied also to winding machines receiving a continuous web material directly from a production machine, and comprising, upstream of the winding area, a longitudinal cutting system for slitting the web material into individual longitudinal strips, each of which is wound into a respective reel of a plurality of reels produced in parallel from a same web material.

Figure 1:
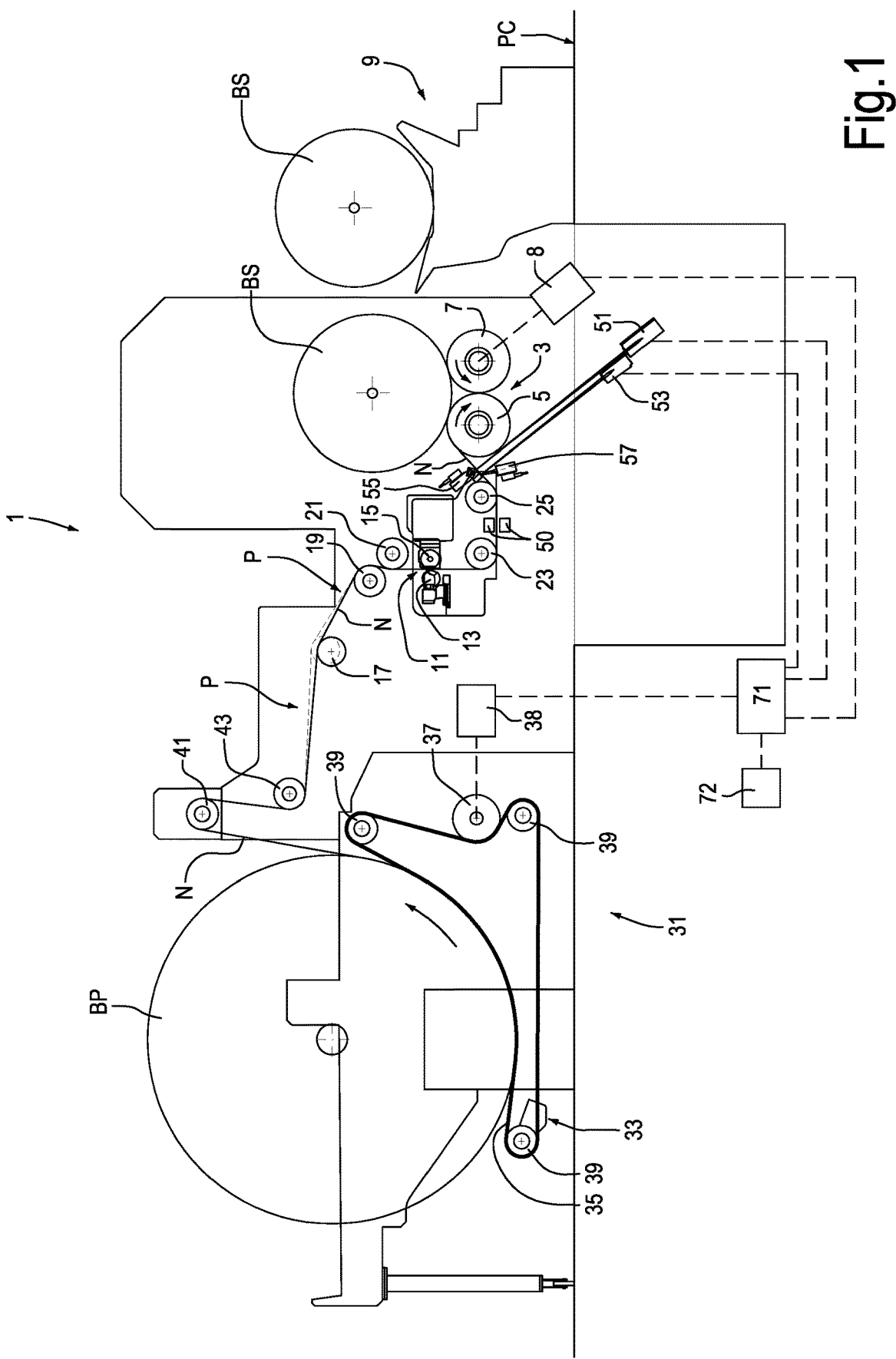
FIGS. 1, 2 and 3 are schematic side views of a rewinder (slitter-rewinder) in three different embodiments.

With initial reference to the embodiment of FIG. 1, a rewinder, indicated as a whole with number 1, comprises a winding station 3, where a web material N, unwound from a primary reel BP, is wound on one or more secondary reels BS. P indicates the feeding path of the web material N, for example a non-woven fabric, from the primary reel BP towards the winding station 3. The feeding direction of the web material N is indicated with F. The secondary reels BS are formed around tubular winding cores arranged in the winding station 3.

The overall structure of the rewinder 1 can be of a known type; therefore, only the main parts thereof, useful for understanding the present invention, will be described.

More particularly, the rewinder 1 is a so-called slitter-rewinder, or rewinder-slitter, which receives an intact web material and slits it into a plurality of longitudinal strips, each of which is wound onto a secondary reel BS. In the winding station 3, several secondary reels BS are arranged, adjacent to, and substantially coaxial with, one another, each receiving and winding a respective strip of web material.

In some embodiments, the winding station 3 comprises a winding cradle. In the embodiment shown in FIG. 1, the winding cradle comprises peripheral winding members. These peripheral winding members may comprise two winding rollers 5 and 7, forming together the winding cradle. Each winding roller rotates around an axis, controlled for example by an electric motor. To this end, two separate motors, or a single motor with a transmission system can be provided. FIG. 1 shows schematically a motor 8 for controlling the winding rollers 5, 7.

The rotation axes of the winding rollers 5, 7 are parallel to each another and lie on a substantially horizontal plane, so that the secondary reels BS can rest on the winding rollers 5, 7 by gravity. Further winding members may be also provided, for example a third winding roller arranged over the reels BS and having a mobile axis to follow the growth of the secondary reels BS during the winding cycle. Number 9 indicates an unloading system for unloading the secondary reels BS from the winding station 3.

The rewinder 1 also comprises a cutting device 11 including a series of disc-shaped knives or blades 13 co-acting with a series of corresponding counter-blades 15 or with a counter-roller. The cutting device 11 can be configured in a known manner. Examples of cutting devices are described for instance in EP1245354 and EP1245519, WO96/28285, WO96/28284, US2008/0148914.

Each blade 13 and each counter-blade 15 can be adjustable in transverse direction, i.e. orthogonally to the feeding path P of the web material N, to cut longitudinal strips of web material of suitable width. FIG. 4 schematically shows six cutting blades 13, which slit the web material N into five longitudinal strips S1, S2, S3, S4, S5 and two lateral trimmings R1, R2. The number of longitudinal strips is purely indicative. In general, the web material N can be slit into a plurality of "n" strips S1-Sn.

The reference number 12 indicates a device for detecting the position in the transverse direction (i.e. orthogonally to the plane of the figure) of the blades 13. For example, the device 12 may comprise an encoder, which detects the absolute displacements of the individual blades when they are positioned. Systems for detecting the blade position are known per se; therefore, they are not described in detail herein. As it will be clearly apparent from the description below, the device 12 can be useful not only for knowing and storing the blade position, in order to manage it, but also for determining the width of the strips of web material in the area where they are formed, slit by the blades 13 and the counter-blades 15.

Along the feeding path P of the web material N, guide rollers 17, 19, 21 can be arranged upstream of the cutting device 11, and guide rollers 23, 25 can be arranged downstream of the cutting device. The number and position of the guide rollers are given just by way of example. In some embodiments, one of the rollers upstream of the cutting device 11, for example the roller 17, can be a bowed roller, i.e. a so-called banana roller, which transversely stretches the web material N to remove wrinkles or creases.

The rewinder 1 may comprise an unwinder 31, provided with members for unwinding the primary reels BP. The unwinder 31 can be an integral part of the rewinder 1, or it can be a separate machine combined with the rewinder 1. The unwinder 31 comprises unwinding members, for example tailstocks, which axially engage the primary reel BP. In other embodiments, as illustrated schematically in FIG. 1, the unwinder comprises peripheral unwinding members 33, which may comprise one or more continuous belts 35 driven around pulleys 37, 39, one of which (for example the pulley 37) is motorized. In FIG. 1, number 38 schematically indicates the motor of the motorized pulley. Guide rollers 41, 43 can be provided to guide the web material N towards the banana roller 17. In other embodiments, central and peripheral unwinding members can be provided in combination.

The rewinder 1 of FIG. 1 is provided with a web material evaluation system comprising a first video camera 51 and a second video camera 53. The video cameras 51, 53 can be housed in a pit under the floor PC, on which the main structure of the rewinder 1 stands, and can be arranged at such a distance from the feeding path P of the web material N as to frame the entire width of the web material N.

The video cameras 51, 53 can be combined with lighting devices. In the illustrated embodiment, a first lighting device 55 is provided for the first video camera 51 and a second lighting device 57 is provided for the second video camera 53. In the embodiment of FIG. 1, the first video camera 51 and the first lighting device 55 are arranged on opposite sides of the feeding path P. The first video camera 51 therefore captures transparent images of the web material N. Vice versa, the second video camera 53 and the second lighting device 57 are arranged on the same side of the feeding path P, and the second video camera 53 therefore acquires reflective images. "Transparent" or "in transparency" means that the web material N passes between the lighting device and the video camera, and it is therefore back-lit with respect to the video camera. Conversely, "reflective" or "in reflection" means that a contrast screen is arranged on the opposite side with respect to the video camera and the lighting device and is by the lighting device. Sometimes, the screen advantageously consists of a roller, around which the web material N is driven. In this case, focusing of the video camera is easier.

If a video camera is not able to frame the entire web material N in transverse direction, in order to analyze the entire width of the web material N several video cameras (usually two to four) can be provided, aligned with one other.

In the configuration of FIG. 1 the video cameras 51 and 53 with the respective lighting devices 55, 57 are arranged in the last segment of the feeding path P of the web material N, that is directly upstream of the first winding roller 5. In practice, no other mechanical members are arranged between the areas framed by the video cameras and the point where the strips of web material are wound onto the secondary reels BS. In this way, it is possible to capture images of the web material N exactly as it is wound on the secondary reels BS, without other operations being performed on the web material N that could lead to defects or otherwise modify the features of the strips of web material.

In other embodiments, the video cameras can be arranged further upstream than what illustrated in FIG. 1, but preferably downstream of the cutting device 11.

In the diagram of FIG. 1, reference number 50 indicates a metal detector, which can be positioned downstream of the cutting device or unit 11, for example between the guide rollers 23 and 25. In this position, it is possible to detect the presence of metal particles, which can for example detach from the blades and/or counter-blades.

Figure 2:
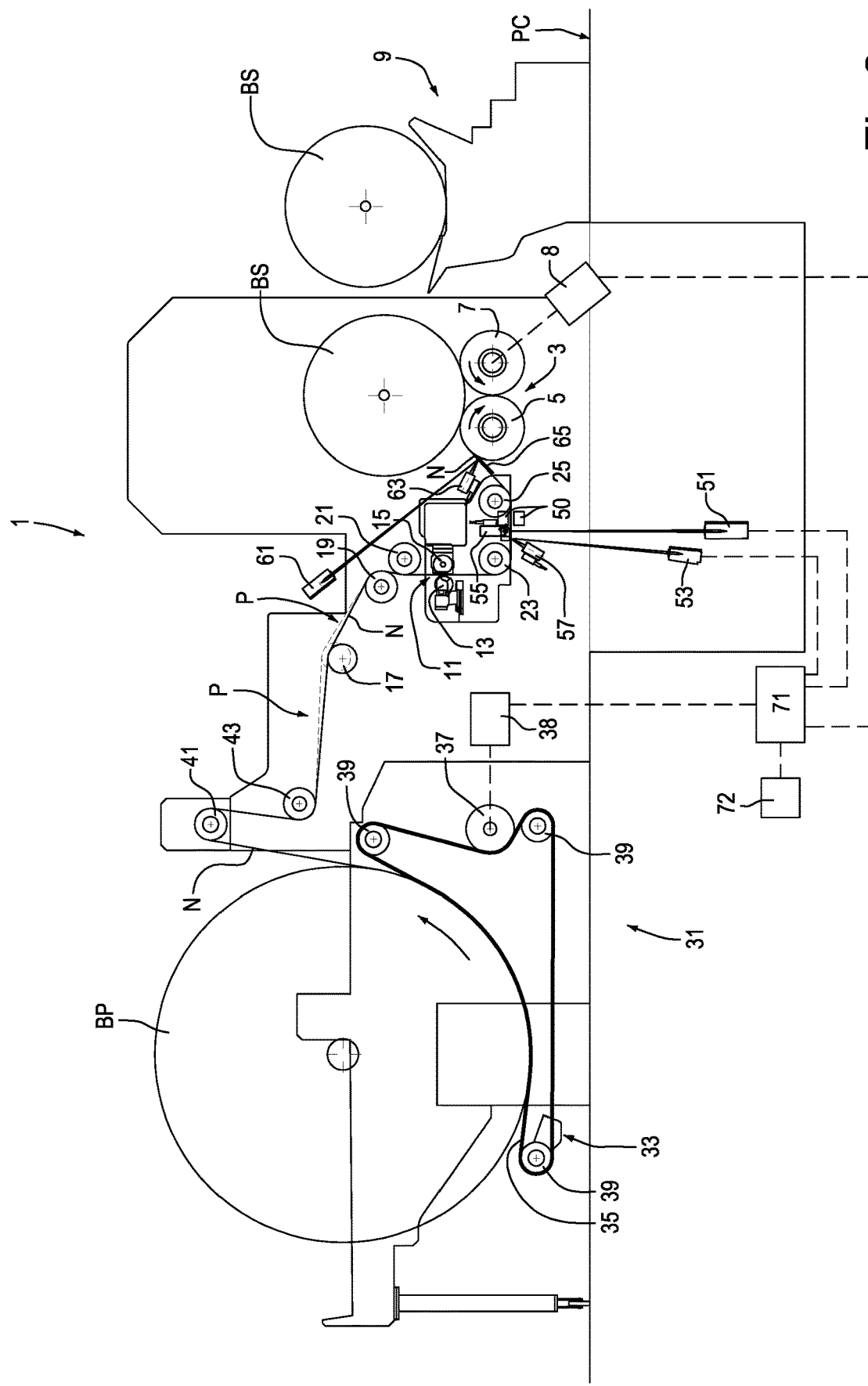
Figure 5:
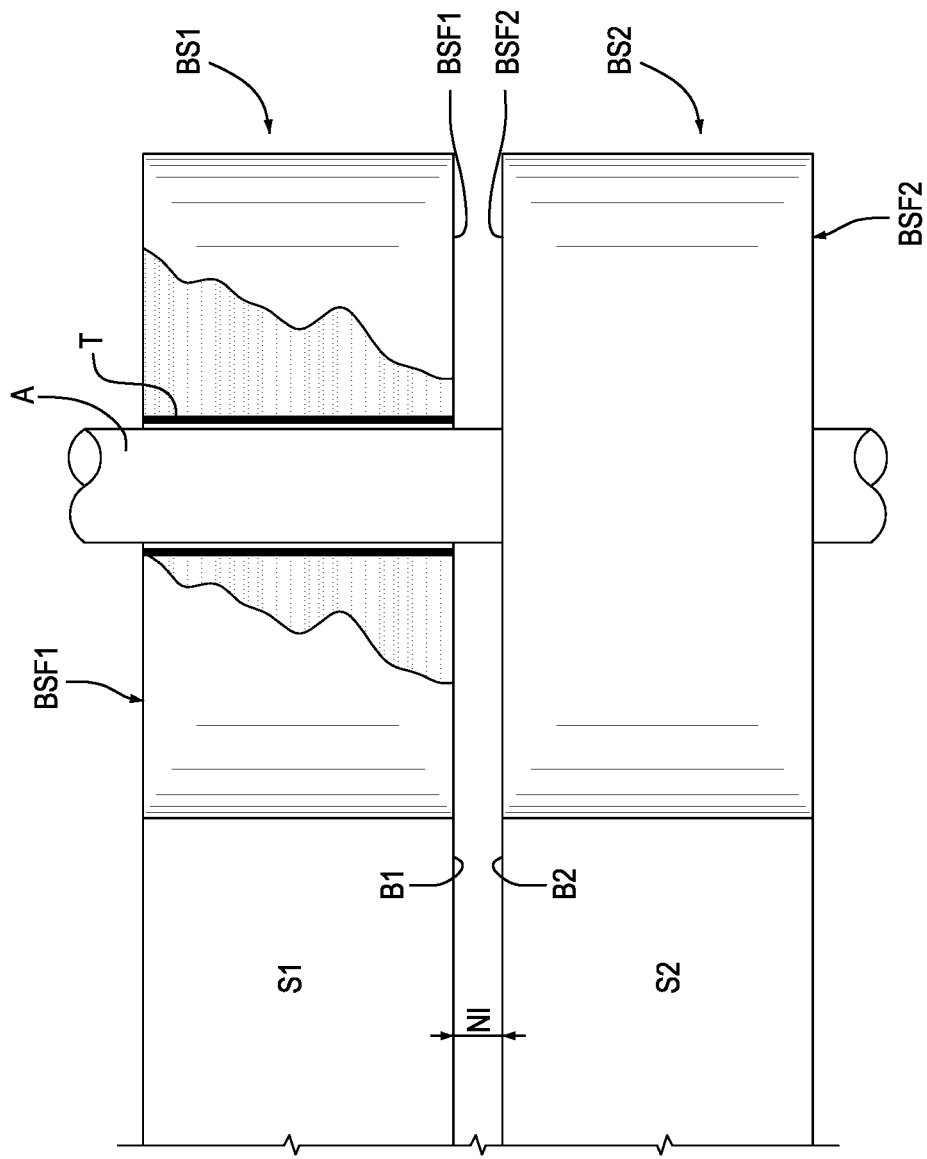
FIG. 5 is a schematic view of two secondary reels during winding.

FIG. 2 shows a second embodiment of a rewinder 1 according to the invention. The same numbers indicate equal or corresponding parts to those described with reference to FIG. 1; these parts will not be described again. In the embodiment of FIG. 2, two video cameras 51, 53 are provided with respective lighting devices 55 and 57, adapted to capture transparent and reflective images, similarly to what illustrated in FIG. 1. However, in this second embodiment the two video cameras 51, 53 are arranged slightly further upstream along the feeding path P and more exactly between the two guide rollers 23, 25 that are placed before the winding roller 5. This allows arranging a third video camera 61 with a respective lighting device 63 directly upstream of the first winding roller 5. In this embodiment, the third video camera 61 captures reflective images. It can be arranged so as to frame a portion of web material N in contact with the winding roller 5 or, as shown in FIG. 5, a portion of web material N in contact with a diffusing or reflecting screen 65, for example directly adjacent to the winding roller 5.

Figure 3:
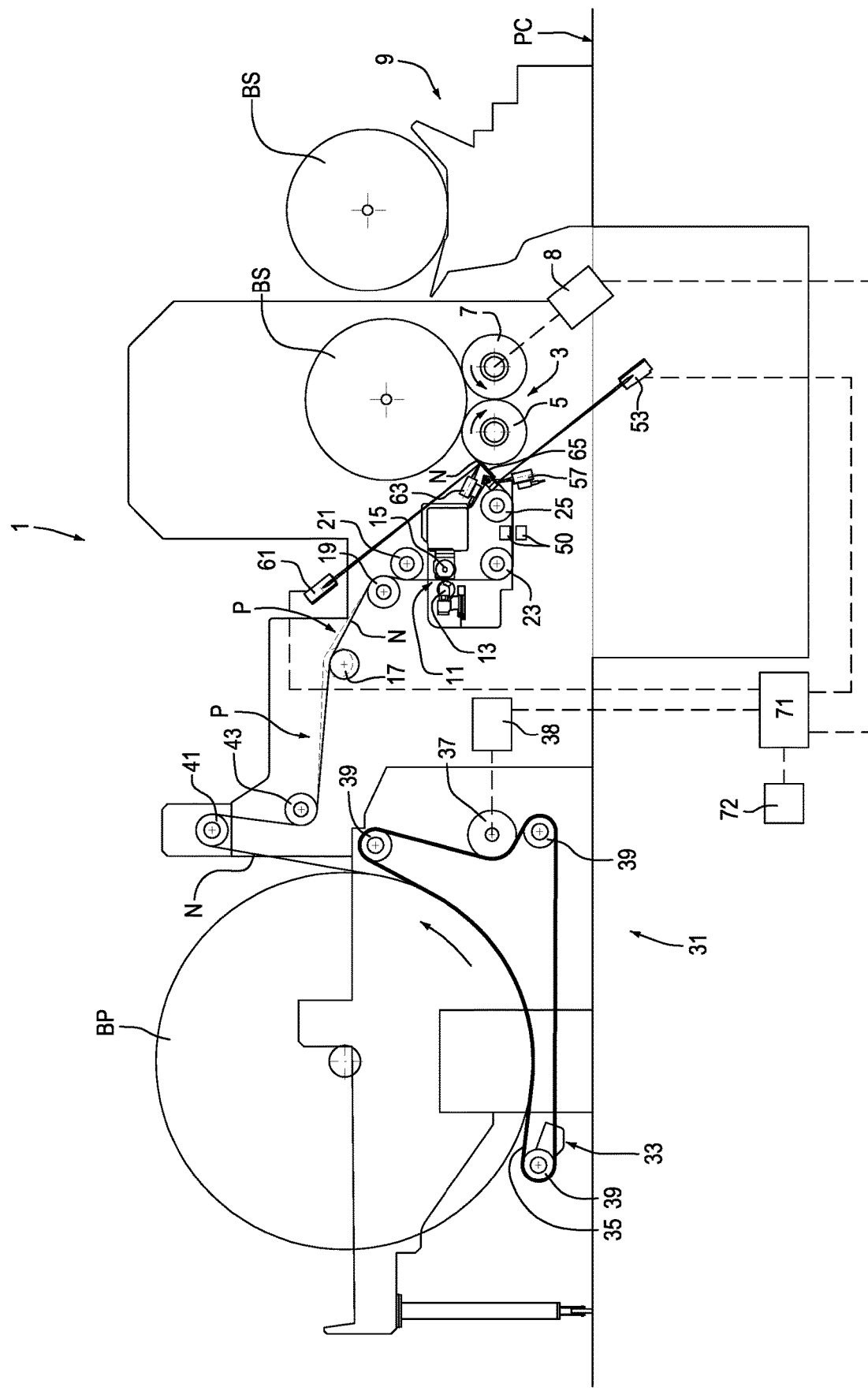

The arrangement and the number of video cameras described with reference to FIGS. 1 and 2 are given just by way of example. Other arrangements are possible. For example, FIG. 3 shows a rewinder 1, which differs from the previous ones mainly in the different arrangement of the video cameras. In this case, a first reflective video camera 53 is provided with a respective lighting device 55 that are arranged as in FIG. 1, and a second video camera 61 with a respective lighting device 63 that are arranged as in FIG. 2, but without the video camera 51.

In other embodiments, not shown, only one video camera (or array of video cameras) can be provided, based on the reflection or, preferably, the transparency system.

The video cameras can be interfaced with a programmable control and processing unit, for example a PLC or a computer, schematically indicated with 71. The programmable unit 71 collects and processes (in real or deferred time) the images captured by the video camera(s), with which the rewinder 1 is provided.

The images can be processed, for example, for identifying any defects or criticalities in the web material N. As the video cameras are arranged so as to frame the strips of web material N in areas very close to the winding point (winding rollers 5, 7), it is possible both to identify defects made on the web material in the last processing steps, for example when it is slit into strips, and exactly to localize in which secondary reel BS there is the detected defect.

Generally speaking, the purpose of the video camera system described herein is that of checking the web material at the end of the forming process and of web handling, in order to collect the defects due to both the processes (formation of the web material and handling thereof, for example cutting and rewinding thereof). Therefore, the system is not used to prepare a map of the defects allowing the operator to remove the defects from the web material during the rewinding phase, but to certify the quality of the secondary BS reels produced by the manufacturer of the non-woven fabric or other web material N.

This novel arrangement of video cameras in the rewinder 1 has many advantages, some of which are listed below.

For example, the system can verify that the operator of the rewinding machine has effectively removed all the defects detected by the first vision system (and/or by the metal detector), installed upstream of the winder (not shown). In fact, it could happen that, by mistake, the product destined to be discarded is wound into secondary reels BS destined to the sale. For example, when starting the production of a certain type of non-woven fabric, for technological reasons a non-calendered non-woven fabric is produced, destined to be wasted and usually excluded from the rewinding process; but due to an operator error it could be wound into secondary reels destined to the sale. The novel arrangement of video cameras according to the invention prevents this.

The video cameras arranged as described above allow verifying that no longitudinal creases are formed during cutting and rewinding. In fact, after the web material N has been slit into strips S1-Sn, also due to the fact that the speed of the web material during the rewinding step is significantly higher than the speed of the web material during the formation step (approximately 2-3 times higher), longitudinal creases may be formed. These are formed due to aerodynamic effects acting when the web material moves forward at high speed and disappear when the web material moves forward at low speed. That is, the creases are formed during normal winding, but disappear when the outer turns of the secondary reel are wound.

In fact, the outer turns of the secondary reels BS are wound when the rewinder is in deceleration ramp step, i.e. when the speed of the web material is reduced. Due to this, a simple visual examination of the outside of the secondary reel BS does not allow to recognize whether the reel has longitudinal creases thereinside. On the contrary, the arrangement of video cameras described herein makes it possible to identify this defect, independently of the step when it occurs.

The arrangement of video cameras described herein allows detecting any lateral displacement of the strips due to aerodynamic effects. These movements must be avoided, as they could compromise the flatness of the reel heads. This defect can be readily detected and measures can be taken to avoid jeopardizing the quality of the secondary reel, or to discard the reel. More details on the methods usable for controlling these phenomena will be described below with reference to specific embodiments.

The arrangement of the video cameras described above allows controlling the quality of the cut edges so as to monitor the wear of the disc-shaped blades 13 cutting the edges.

The video cameras also allow verifying whether a blade 13 has stopped cutting, thus compromising the good quality of the whole series of secondary BS reels wound in a winding cycle. In fact, if one of the blades 13 stops cutting, a wrap up of the whole machine can easily occur, which compromises the winding of the whole series of reels.

The video cameras also allow to check the presence of all the strips S1-Sn and to verify that they move in the desired direction forming the respective secondary reels BS. If, due to any problem (breakage of the strip, or other problem), the path of a strip changes and the strip starts to be wound around another mechanical member, this would lead to malfunctions and breakages of members of the rewinder, with consequent downtimes and production loss. Therefore, the prompt notification of situations of this type by using video cameras as described above has significant advantages in terms of time-savings and reduction of maintenance costs and spare parts.

Video cameras may constitute systems for measuring the width of the strips and of the so-called neck-in between the various strips S1-Sn, i.e. the mutual distance between edges of adjacent longitudinal strips due to the transverse contraction thereof following the tension of the web material. The neck-in is the distance between the edge of one strip and the edge of the adjacent one. This aspect will be further illustrated below with reference to some specific operating methods.

Determining the neck-in can be useful for various reasons. In particular, although not exclusively, determining the neck-in of a given web material facilitates prediction of the neck-in of web materials produced with different recipes.

Sometimes, defects are found in diapers or in other finished products produced by using the web material of the secondary reels BS. For example, insects can be found, caught in the plies of diapers. In this case, it is always difficult to establish whether the defects were generated at the plant of the manufacturer of the non-woven fabric or other web material N, or if they were generated in the converting plant where diapers or other finished products are produced. With a vision system installed immediately before winding it is easier, in these cases, to attribute the responsibilities.

The width of the strips of wound web material is a quality index of the secondary reels BS. The more constant the width of the strip forming a secondary reel BS, the greater the quality of the reel. This condition is necessary in case that further components—such as glue, rubber bands, fluff, etc.—are placed on the web material unwound in the converting machine producing the finished articles (diapers or other products). In fact, if the web material is narrower than indicated, there is the risk that the components placed thereon exit the edges of the web material being unwound and do not couple therewith. The vision system, by calculating instant by instant the width of the strips of web material, can certify that the width of the web material wound inside each secondary reel BS is within the allowable limits. Depending on the allowance, if necessary it is possible to classify the secondary reels BS in different quality classes, for example first choice reels and second choice reels.

Without the web material evaluation system described herein it is possible to verify the width only by destroying the secondary reel to be evaluated. That is, this quality test is a destructive test, and currently it is therefore performed only randomly. The new system for evaluating the web material avoids these drawbacks and allows saving material, as it avoids destructive tests, and furthermore allows testing all the produced reels and not only some samples randomly.

A further index of the quality of the reels is the flatness of the side thereof. The measurement of the absolute position of the edges of the various strips S1-Sn forming the various secondary reels BS is an indirect index of the flatness of the sides of the secondary reels BS. The web material evaluation system, by controlling the position of the edges of the strips of web material, allows keeping under control also this feature of the secondary reels BS.

The web material evaluation system described herein also allows further advantages.

In fact, the secondary reels BS having a defect inside are sorted by the packaging machines so that they are not sold as first quality reels, but follow a different path in the logistics system. For example, they can be sold as second quality reels or they can be used for recycling the raw material. There is therefore a classification of the secondary reels BS based on the presence of defects. According to the state of the art, this classification is based on the signal of the vision system installed upstream of the winding machine and on the basis of the distribution map of the reel BP into secondary reels. This map is prepared based on the position of the blades 13 and on the nominal length of the web material wound onto each series of secondary reels BS wound in a winding cycle. However, tracing the map of the primary reel BP is also affected by parameters that are difficult to evaluate, such as:

a. the elongation of the web material due to the winding tension in the winder and the winding tensions during the rewinding step,
  b. the length of the web material discarded during the rewinding step,
  c. the transverse shrinkage of the web material due to the high value of the Poisson's ratio of the non-woven fabric and to the winding tension (in the winder) and the winding tensions during the rewinding step. This shrinkage causes the defects to move towards the centerline when the web material is subject to tension. Therefore, when tracing the map it is difficult to establish precisely the position of the longitudinal cuts, and consequently to establish which is the secondary reel BS where the defects detected upstream of the winder will occur,
  d. during the steps of unwinding the primary reel BP and rewinding into secondary reels BS, the banana roller 17 tends to widen the web material, and therefore it tends to move the defects away from the centerline. In the reel distribution map it is therefore difficult to establish exactly the "boundaries" of the secondary reels, and this makes difficult to know whether a defect pertains to one or another secondary reel, especially if the defect is found in a border area. The new system described herein allows direct reading the defects and the position thereof, making thus possible to know in which reel a certain defect occurs.

In order to cut longitudinally the web material N into longitudinal strips S1-Sn by means of the blades or knives 13 of the cutting device 11, the web material must be subjected to a longitudinal tension. Once the web material N has been slit into longitudinal strips, due to the transverse contraction caused by the longitudinal traction, the width of each strip is smaller than the distance between the cutting edges of the blades 13, which have formed said strip. That is, after cutting the strip shrinks, due to the tension and the high value of the Poisson's ratio of the web material.

Figure 4A:
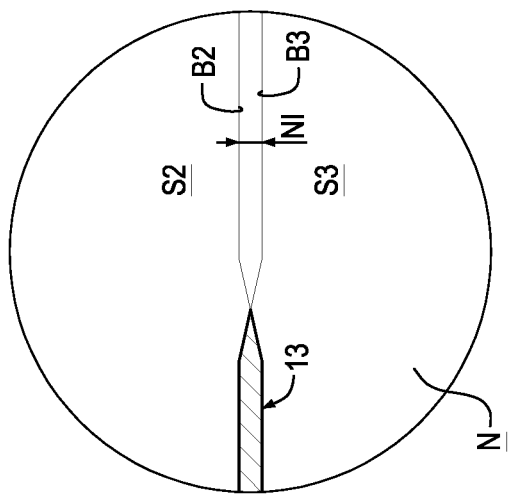
FIG. 4A is an enlargement of the detail indicated by the letter A in FIG. 4.
Figure 4:
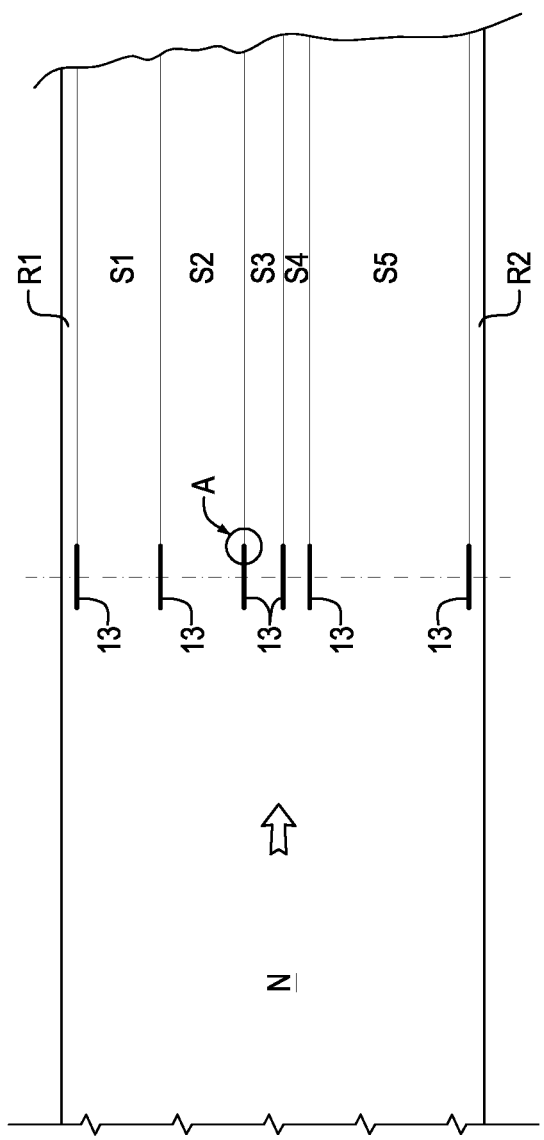
FIG. 4 is a schematic view of the area where the web material is slit into longitudinal strips.

In FIG. 4A this phenomenon is schematically shown. The distance between adjacent edges of two adjacent strips is called "neck-in" and is indicated, in FIG. 4A, with NI. In FIG. 4A the neck-in is shown between the longitudinal edge B2 of the strip S2 and the longitudinal edge B3 of the adjacent strip S3.

In the rewinding machines 1 of the type described herein, the positioning in transverse direction of the blades 13 and of the respective counter-blades 15 is controlled by a computer or a programmable control unit 71 which calculates the different locations at which the blades shall be positioned based on the width of the longitudinal strips S1-Sn of web material N to be produced. The calculation program for positioning the blades 13 requires the operator to input data, including the width of each strip to be obtained and the shrinkage value (the neck-in value). Each blade is positioned in the centerline of the neck-in (or in such an intermediate position that the fraction of neck-in which is to the left of the blade 13 is proportional to the width of the strip S1-Sn to the left of said blade, while the fraction of neck-in which is to the right of the blade 13 is proportional to the width of the strip to the right of said blade. Other alternative proportionality criteria are also possible.

Moreover, one of the market's requirement is that in the secondary reel BS no parts of tubular winding core project outside the flat face of the reel, for at least two reasons.

Firstly, when the secondary reels BS are packaged and prepared for shipment to the converting plant, they are stacked with the rotation axis thereof in vertical position, so that during transport the reels do not take an oval shape. In order for the stack of reels to be stable, the tubular winding cores must not project axially from the reels.

Secondly, in the converting step, when the secondary reels BS are unwound to produce the final product (for example diapers, sanitary napkins, soaked wipes, and other articles), they are positioned on the unwinding reel of the converting machine. The correct axial position is identified by placing the tubular winding core against an axial reference provided on the winding reel. Any protrusion of the tubular winding core from the flat end surfaces of the reel would lead to positioning errors, negatively affecting the production of the finished product.

While the strip width values can be evaluated easy, because they represent the goal of the production, the neck-in values are difficult to be determined. The width of the neck-in is affected by many factors, including: the mechanical properties of the web material; the width of the strips adjacent to the neck-in; the temperature of the web material during the rewinding step; the tension to which the web material is subject; the effect of the banana roller 17 or of any other system for spreading the web material.

The data on the width of strips and neck-ins are used by the machines that shall cut and position the tubular winding cores of the secondary reels BS on winding rods or shafts, which are then inserted into the winding station 3 for forming, around each tubular winding core, a respective secondary reel BS. On the basis of the aforementioned data, the tubular winding cores are formed by cutting a tube of greater axial length and positioned on the winding rods or shafts so that the edges of the winding cores are aligned with the flat faces of the reels. These preliminary operations can be performed by means of known machines, for example disclosed in U.S. Pat. No. 8,096,948 and in U.S. Pat. No. 6,655,629, which may be referred to for more details.

According to the state of the art, the neck-ins are evaluated based on work experience, or based on attempts by successive approximations. This method is not satisfactory.

Through the web material evaluation system, some embodiments of the rewinders disclosed herein allow to measure the position of the edges of the web material N slit into longitudinal strips S1-Sn in a suitable position, and preferably immediately before the winding point, so as to transmit the necessary data to the machines preparing the winding rod or shaft, with the tubular winding cores inserted thereon. The aim is to loop-close the chain of operations that includes:
  positioning the blades 13 and the counter-blades 15 for cutting the web material N,
  cutting the tubular winding cores,
  positioning the tubular winding cores onto the winding rod or shaft,
  winding the strips of web material into secondary reels BS, taking into account the shrinkages and the causes thereof mentioned above.

Essentially, after having cut and divided the web material N into longitudinal strips S1-Sn, the web material evaluation system N described herein allows to detect accurately the position of each longitudinal edge (e.g. the edges B2, B3 in FIG. 4A) and then to determine or verify the width of each strip and the neck-in NI (see FIG. 4A) between each pair of adjacent strips. Based on these data, it is possible to prepare tubular winding cores of correct axial length and to position them accurately onto the respective winding rod or shaft. In this way, the edges of the tubular winding cores will coincide with the edges of the strips S1-Sn, without the need for the operator to intervene for processing and inputting data. Consequently, the ends of each tubular winding core will be surely in the correct position with respect to the flat surfaces of the respective secondary reel BS.

The position of the longitudinal edges of the strips S1-Sn can be detected, downstream of the cutting device 11, by means of one or more video cameras, with which the machine 1 is provided.

For better understanding what explained above, in FIG. 5 a pair of secondary reels BS1, BS2 are schematically shown, onto which two strips S1 and S2 respectively of web material N are being wound. B1 and B2 indicate the longitudinal edges adjacent to each other of the strips S1 and S2. The secondary reels BS1, BS2 are wound around tubular cores T, inserted and locked onto a winding rod or shaft A. The shaft can be expandable, for example pneumatically, in known manner. A variable number of tubular winding cores can be mounted onto the shaft, corresponding to the number of secondary reels being formed simultaneously.

As shown in the diagram of FIG. 5, with a partial cross-section of the reel BS1, the tubular cores T have ends that are inside or preferably flush with the head surfaces, or flat front surfaces BSF1 and BSF2 of the secondary reels BS1, BS2. In this way, the tubular winding cores T do not constitute an obstacle to the subsequent processing and converting of the secondary reels BS.

According to methods described herein, different techniques can be used to detect the neck-ins NI, i.e. the distances between adjacent longitudinal edges B2, B3 (FIG. 4A) or B1, B2 (FIG. 5). For example, a vision system can be used, comprising at least one video camera or more video cameras aligned with one another, as described with reference to FIGS. 1, 2, and 3. Advantageously, the video camera(s) may be arranged to frame the web material N slit into strips immediately upstream of the winding point, as illustrated for example in FIG. 1 for the video camera 51 or in FIGS. 2 and 3 for the video camera 61. In this way, the data on the width of the strips S1-Sn and the size of the neck-in are accurately determined and cannot be modified due to further processing before winding.

Instead of using video cameras and the related image processing software, in order to determine the width of the strips S1-Sn and the neck-in, other alternative systems can be used, as mentioned in the introduction to the present description, for example laser scanners, photocells, electrostatic systems or the like.

To use the data detected by the web material evaluation system in order to check the neck-in values and to arrange correctly all the tubular winding cores T on the winding shaft or rod A, the following method can be performed.

At the beginning of the production of a certain batch of secondary reels BS of web material, for example a non-woven fabric, which is cut into a certain number of strips S1-Sn of defined width, the web material N is drawn in the rewinder.

Through a suitable interface, for example a control panel 72 (FIGS. 1, 2, 3), the positions of the blades 13 and of the counter-blades 15 of the cutting device 11 are set according to the width of the various strips S1-Sn to be obtained, as well as the assumed neck-in values, for example estimated based on the operator's experience. All the machine parameters are set according to the desired production, for example: tension of the web material, stretching of the web material between the rollers along the feeding path P, position of the banana roller 17 (or of another spreading system for spreading the web material N).

Tubular winding cores T are cut to a size corresponding to the width of the strips to be obtained, and are positioned on the winding shaft or rod A in the positions corresponding to the positions of the respective strips S1-Sn, taking into account the estimated neck-in values and the winding shaft or rod with the tubular winding cores T is placed in the winding station 3.

Then, the rewinder 1 is started at reduced speed and so that it can process a small length of web material (small compared to the length wound on a reel). The web material evaluation system acquires data for determining the effective width of the strips S1-Sn and the actual size of the neck-in.

Once this acquisition step has been completed, the rewinder 1 stops and the material that has just passed through the rewinder is discarded.

The blades 13 and the counter-blades 15 of the cutting device 11 are positioned again, defining their position by means of a mathematical calculation based on the acquired data on the effective width of the strips and the neck in.

The mathematical calculation can be based for example on the following approach. The neck-ins do not vary between the production made with the blades 13 and counter-blades 15 in the first position and in the second position, while the width of the strips S1-Sn is changed by the mathematical calculation. That is, the distance between two cutting edges of blades 13 is adjusted according to the error on the neck-in and according to the error recorded on the width of the strips. The mathematic, on which this principle is based, is expressed by the formula $$T_i^{(2)} = T_i^{(1)} + S_i^{(2)} - S_i^{(1)}$$

where
$T_i^{(2)}$ is the distance between the cutting edges of two consecutive blades cutting the i-strips after repositioning, and it is therefore the value required;
$T_i^{(1)}$ is the distance between the cutting edges of the two consecutive blades in the first step of the operating cycle, i.e. before repositioning;
$S_i^{(2)}$ is the width of the i-$^{th}$ strip
$S_i^{(1)}$ is the width of the strip read during the test step, i.e. before repositioning the blades 13.

In other embodiments, a different approach can be used. The neck-in values follow a proportionality principle with respect to the width of the adjacent strips. Proportionality may be direct (linear relationship) or proportionality with respect to a function where the independent variables are the set width of the strip and the measured width. This principle is expressed by the following formula:

$$T_i^{(2)} = T_i^{(1)} \frac{S_i^{(2)}}{S_i^{(1)}}$$

where the symbols have the same meaning as above.

According to a further approach, the position of the cutting edges of the disc-shaped blades 13 is not in the center of the neck-in; contrarily, the neck-in is subdivided by the cutting edge into two portions, each proportional to the width of the adjacent strip. "Proportionality" may refer to direct proportionality, or to proportionality with respect to a function where the independent variables are the width of the strips on the right and on the left of the neck-in in question.

The actual production of the batch of secondary reels BS starts after having removed the first series of secondary reels BS and after having repositioned the blades 13 and the counter-blades 15. Before starting the actual production, the following three interventions may be performed:

A. the blades 13 and the counter-blades 15 are positioned based on the new locations generated by the mathematical calculation, wherein the input data are the data acquired by the evaluation system on the width of the strips S1-Sn and on the neck-ins;

B. the tubular winding cores T are cut with lengths adapted to the actual width of the strips S1-Sn detected by the evaluation system;

C. the tubular winding cores T are positioned on the winding shaft or rod A according to the reading of the edges of the web material cut into strips. The ends of the cores are positioned at the edges B2, B3 (FIG. 4A) or B1, B2 (FIG. 5) detected.

Briefly, by using the information acquired through the evaluation system of the web material N it is possible dimensioning and positioning correctly the tubular winding cores T, so that the cores remain inside or flush with the flat head or front surfaces (BSF1, BSF2, FIG. 5) of each respective secondary reel (BS1, BS2).

What described with reference to managing the neck-in and dimensioning and positioning the tubular winding cores T on the winding shafts or rods A by using the evaluation system of the web material N described herein allow improving the quality of the secondary reels BS produced during the rewinding process.

The method can be also further improved for taking into account other factors that could affect the correct winding, and therefore the quality, of the secondary reels BS.

In fact, as mentioned above, the secondary reels BS produced by the rewinders 1 may be used, for example, for producing baby or adult diapers, sanitary napkins or other finished products particularly complex to be produced and for which some qualitative features of the secondary reels BS are critical. The qualitative needs may be, in particular, the flatness of the head surfaces (BSF1, BSF2, FIG. 5) of the secondary reels BS, as well as the constant width of the reel.

In fact, if the edges of the strip of web material coming from a secondary reel BS being unwound in the converting machine are not always in the same position, and move transversely with respect to the feeding direction, for example due to a non-uniform width of the strip wound into the secondary reel BS, or due to a zig-zag pattern of the edges, problems could arise in forming the finished products. For example, in the production of a diaper or a sanitary napkin, the various layers of the product could be glued in a wrong position, the glue could exit the edges of the diaper or sanitary napkin, the cutting dies of the single diapers or napkins could leave traces on the precut material.

While winding the secondary reels BS, a fixed and constant position of the edges B2, B3 (FIG. 4A) or B1, B2 (FIG. 5) of the strips S1-Sn results in good flatness of the sides or front surfaces (BSF1, BSF2) of the secondary reels BS. The constant width of the strip of a primary reel BP being unwound and the constant position of the edges B2, B3 of a strip S1-Sn coming from the cutting device 11, are particularly important factors for evaluating the quality of the secondary reels BS produced, and for guaranteeing the absence of problems in the operation of the converting machine used for producing finished products starting from the secondary reels BS.

According to the prior art, the width of the strips and the position of the edges of each strip S1-Sn being wound are controlled indirectly. In other words, it is assumed that the mechanical properties (elastic modules, Poisson's ratio, etc.) of the web material N remain constant throughout the length of the web material N, and particular attention is given to keep the tension of the web material N under control along the feeding path P, to avoid a variable contraction of the strips S1-Sn during winding.

According to the prior art, the tension of the web material is detected through rollers mounted with the interposition of load cells, whose signal is used as feedback signal to manage the motor 38 of the unwinder 31. The motor of the unwinder 31 transmits the motion to the primary reel BP by means of a mechanical transmission and belts 35, which connect the mechanical members, driven in rotation by the motor, with the outer surface of the primary reel BP. Thus, there is a direct proportionality (at least at theoretical level) between the angular speed of the drive shaft actuating the belts 35 of the unwinding members 33 and the peripheral speed of the belts 35 and therefore of the cylindrical outer surface of the primary reel BP. The motor 38 of the unwinder 31 is controlled so that the peripheral speed of the unwinding belts 35 is the same as the peripheral speed of the rollers 5, 7 of the winding station 3, on which the secondary reels BS are formed. The motor 38 interfaces the control unit and the signal driving the motor 38 of the unwinder 31 is operated by the signal coming from the load cells via a PID (proportional, integral, derivative) regulator. The other rollers of the rewinding machine are controlled with a speed variation (in percentage) with respect to the speed of the winding rollers 5, 7 or to the speed of the motor 38 of the unwinder 31. The percentage values of speed variation of the various rollers are set by the operator.

The rewinder is a start-stop machine, that is, it starts from a complete standstill, accelerates up to the working speed set by the operator, keeps this speed for a certain period of time or for a certain winding length, and then decelerates until stopping to allow the removal of the secondary reels BS formed. It is therefore a machine, whose rollers are subject to accelerating and decelerating torques.

From the description above it is clearly apparent that a change in the features of the web material N during rewinding, for example a change in the Poisson's ratio, causes an undesired variation of the width of the strips S1-Sn. In fact, the regulation according to the prior art consists in keeping the tension of the web material N constant during rewinding, assuming that the lateral contraction of the web material is constant (constant Poisson's ratio). If the Poisson's ratio varies along the extension of the web material, maintaining the tension of the web material constant, the width of the strips S1-Sn obtained by longitudinally cutting varies accordingly and this negatively affects the final quality of the secondary reels BS.

Further variations of the width of the strips, which negatively affect the quality of the secondary reels BS produced, can result from the reciprocal sliding or shifting between the web material N and one or more of the rollers determining the traction thereof. Shifting can occur in particular in the acceleration and deceleration transients of the rewinding machine.

According to some embodiments, these drawbacks can be partially or totally eliminated by using the web material evaluation system described above.

In particular, through one or more video cameras 51, 55, 61 or other devices mentioned above it is possible to detect the positions of the edges of the strips S1-Sn, into which the cutting device 11 has subdivided the web material N. This information can be used for controlling the motors of the rewinding machine that control the tension of the web material, in particular for example the motor 38 of the unwinder 31 and the motor(s) 8 of the winding rollers 5, 7. These motors drive into rotation the primary reel BP and the secondary reels BS. Further motors, not shown, or the same motors mentioned above, may drive into rotation other rollers arranged along the feeding path P, around which the web material is driven (before and/or after having been divided into strips S1-Sn).

The winding tension of the web material results from the behavior of each motor involved in the actuation of one or more web material feeding members. Using the information acquired through the web material evaluation system, it is possible to control the motors to obtain strips S1-Sn of constant width and constant position of the edges of the strips, with consequent formation of high quality secondary reels BS, in particular even if the web material has mechanical features (e.g. Poisson's ratio) which are variable along the longitudinal extension thereof. It is also possible to avoid negative effects on the quality of the secondary reels BS due to speed fluctuations and/or sliding of the web material N on the feeding members.

By controlling the feeding members of the web material N according to the actual width of the strips S1-Sn and the actual position of the edges thereof (actual values of neck-in NI), high quality secondary reels BS can be obtained, avoiding the aforementioned drawbacks of the prior art, and in particular:

the need to assume that the mechanical properties of the web material are constant in every point of the material, and consequent errors deriving from the inaccuracy of such assumption;

risks of sliding of the web material on one or more feeding members, with consequent uncertainty as regards the actual tension imparted to the web material;

errors in measuring the tension of the web material N, that are typical of the load cells, and due for example to balancing errors of the roller on which the load cells are mounted and/or to the variation of momentum of the web material;

measurement errors of load cells deriving from aerodynamic effects, especially at high speed. In fact, all rollers, by rotating, move the surrounding air. If the distribution of air speed and pressure around the roller were axial-symmetrical, the load cells associated with the rotating roller would not be affected by the effect of the air. However, the distribution of the air speed, and therefore of the air pressure field around the roller, is not axial-symmetrical due to the presence of mechanical members close to the roller, including the same web material driven around the roller. This causes errors in measuring the tension of the web material, as the load cells measure stresses applied to the roller by factors other then the tension of the web material;

changes in the web material tension due to aerodynamic phenomena, which are not adequately corrected in the prior art machines.

By using information on the actual width of the strips and on the actual position of the edges thereof, it is possible to control one or more motors, which actuate the feeding members of the web material N for example by acting on one or more of the following parameters:

the angular speed (if the motor is controlled in speed control), or the angular phase (if the motor is controlled in position control), or the torque.

The feedback on the motors can be done directly in the drive of the respective motor or by a PLC controlling the various drives of the motors.

By way of example, one or more of the following data can be used as a signal to manage the various motors driving the feeding members:

the distance between the left edge of the strip on the extreme left of the web material N and the right edge of the strip on the extreme right of the web material N. This principle has the objective of controlling the width of all strips and of all the neck-ins;

the average (or the sum) of the widths of all the strips; this principle aims to keep the total width of all strips constant;

the width of the wider strip;

the width of the strip in the most central position.

In particular, the control of one or more of the motors actuating the web material feeding members can be such as to keep one or more parameters or features of the strips, and therefore of the secondary reels BS, constant. For example, by detecting the neck-in and the actual width of the strips S1-Sn, one or more motors of the rewinder can be controlled by means of a feedback loop so as to correct any deviations from a set value of the neck-in and/or of the width of the strips, so as to keep these parameters perfectly constant, or within defined tolerance limits, for the entire winding cycle.

However, more generally the rewinding method described herein can use the information acquired by the evaluation system of the web material N to control one or more motors of the feeding members with the general purpose of controlling the position and/or the width of the strips produced, without necessarily keeping these parameters constant, but setting a specific trend thereof during the winding cycle. For example, it is also possible to use the control described above to impose a variation in the width of the strips, or a variation in the winding tension, as a function of the quantity (length or weight, for example) of material wound in the secondary reels BS, or the winding time.

During rewinding it is possible to check the lateral shifting of the strips S1-Sn being wound, due to aerodynamic reasons, in particular a high feeding speed of the web material N. Through the web material evaluation system described herein, which is adapted to identify the position of the edges of the individual strips S1-Sn, it is possible to detect the occurrence of lateral shifting phenomena and to implement all the necessary measures to avoid it.

It is for example possible to modify the speed of one or the other feeding member, in order to reduce or eliminate shifting. In some embodiments, if the control measures taken after having detected a lateral shifting are not enough to eliminate this anomaly, the web material feeding speed can be reduced, if necessary, up to the complete stop of the rewinder.

Figure 6:
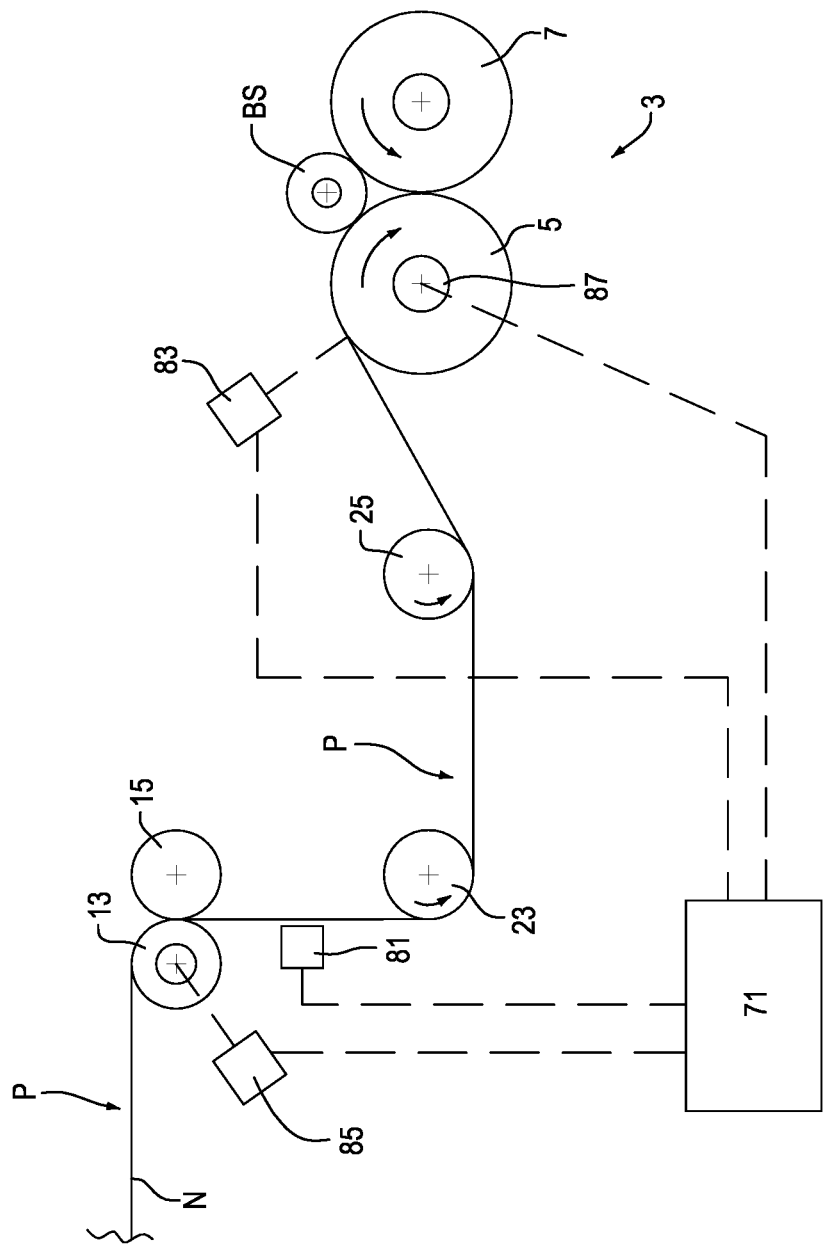
FIG. 6 is a schematic view of the components for calculating the Poisson's ratio of the web material in a rewinder according to embodiments disclosed herein.

In some embodiments of the rewinder 1, the web material evaluation system can comprise an arrangement for measuring the Poisson's ratio, i.e. the ratio of transverse strain. FIG. 6 shows a simplified diagram of some parts of the rewinder 1, with a possible arrangement of members of the evaluation system of the web material N useful for detecting the Poisson's ratio. In FIG. 6, equal numbers indicate parts already described with reference to FIGS. 1 to 3. The evaluation system elements used for measuring the Poisson's ratio can comprise a first device 81 for acquiring information on a first width (i.e. the transverse dimension with respect to the feeding direction) of the web material in a first position of the feeding path P. A second device 83 may be also provided for acquiring information on a second width of the web material in a second position of the feeding path P. The devices 81 and 83 may be video cameras or linear video camera arrays, or any other device, for example of the type described above, adapted to detect the width of the web material N. The devices 81, 83 may also comprise one or more video cameras described above with reference to the diagrams of FIGS. 1 to 3, for example the video cameras 51, 53, 61.

In the diagram of FIG. 6, the first position where the first device 81 is arranged is immediately downstream of the cutting device 11 or in correspondence thereof. In this way it is possible to detect the width of each individual strip S1-Sn obtained by longitudinally cutting the web material N, or the width of only one or some strips. The second device 83 is arranged downstream of the first device and, in the example of FIG. 6, in front of the winding roller 5.

The two positions mentioned above of the devices 81 and 83 are given just by way of example, and different positions can be provided. In general terms, the two positions are such that the feeding speed of the web material is slightly different in the two positions, so that the web material is subjected to longitudinal elongation due to the tension induced by the different feeding speeds, and consequently to transverse contraction.

While in FIG. 6 the two positions where the width of the web material is measured are arranged downstream (or in correspondence) of the cutting device 11, in other embodiments, not shown, the width and the feeding speed are detected upstream of the cutting device 11, so as to calculate the Poisson's ratio of the web material N before it is slit into strips S1-Sn. For example, the device 81 may be associated with the unwinding members 33 of the unwinder 31.

The first width of the strips can be measured by detecting the position of the cutting edges of the disc-shaped cutting blades 13. In this case: the first measurement position coincides with the position of the disc-shaped cutting blades 13 along the web material feeding path and the first measurement device can be a device detecting the transverse position (i.e. the position in direction orthogonal to the web material feeding direction) of the disc-shaped cutting blades 13.

More than one pair of devices may be also provided for detecting the width of the web material, for example both upstream and downstream of the cutting device.

To calculate the Poisson's ratio, a first measurement device 85 is also provided for measuring a first feeding speed of the web material N in the first position of the feeding path, and a second measurement device 87 for measuring a second feeding speed of the web material N in the second position of the feeding path. The speed measurement devices 85, 87 may comprise, for example, laser systems (known on the market), or devices for measuring the rotation speed of rotating members that are in contact with the web material N and whose peripheral speed is equal to the peripheral speed of the web material. To this end, inductive sensors, lasers detecting one or more reflecting surfaces adequately arranged along the roller circumference, magnetic sensors detecting one or more magnets adequately arranged along the roller circumference, may be for example provided.

The devices schematically indicated with 81 and 83 may be one or more of the devices mentioned above for determining the position of the edges of the web material N or of the strips S1-Sn, into which it has been slit.

In some embodiments, as schematically shown in FIG. 6, the first position where the devices 81 and 85 are arranged can match the point where the disc-shaped blades 13 and the counter-blades 15 perform the longitudinal cut. In this way, the width of the strips is equal to the distances between the cutting edges of the blades cutting the strips. In this case, the device 81 can simply be a device detecting the position of the cutting edges of the blades 13. No further detection means are therefore necessary to know the width of the strips in the first position.

In the first position, the longitudinal speed can be detected by optical means. Or, in case the counter-blades are formed by a counter-roller wound by the web material N, if there is no relative sliding between the web material N and the counter-roller, the speed of the web material N can be equal to the peripheral speed of the counter-roller. The counter-roller rotation speed can be easily detected.

Figure 7:
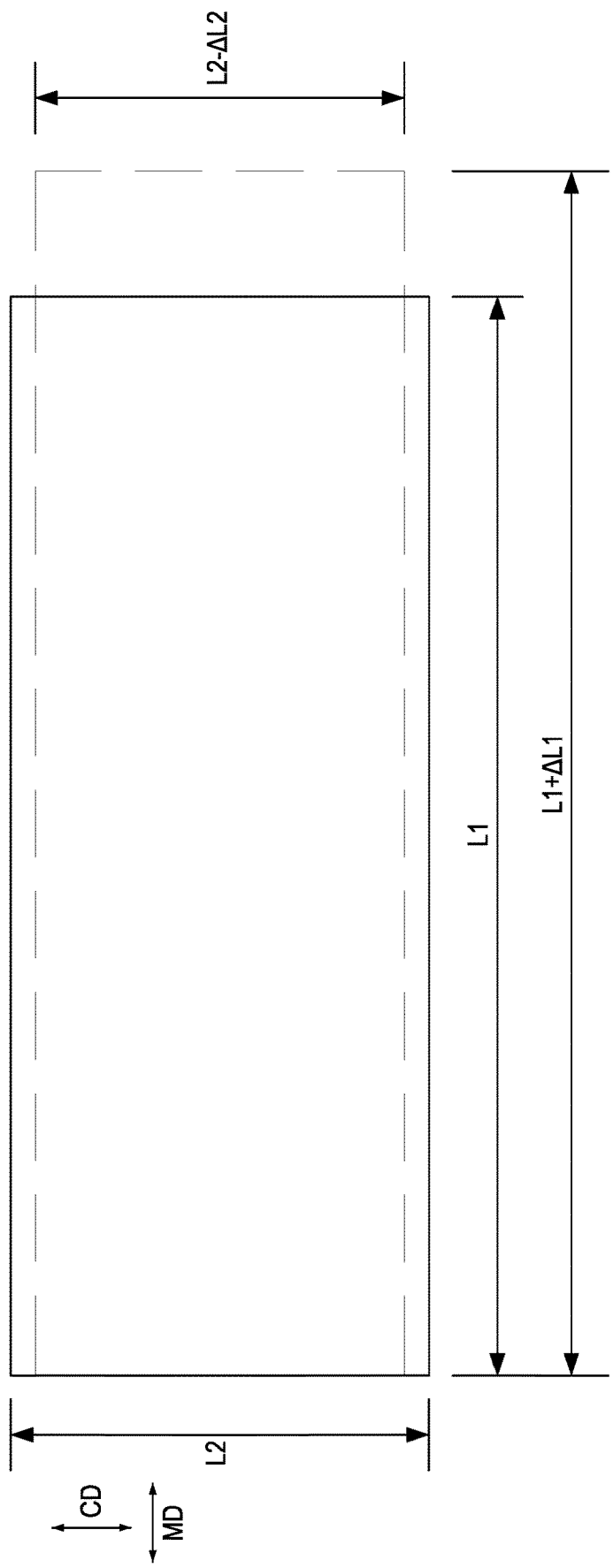
FIG. 7 is a diagram showing the parameters for calculating the Poisson's ratio.

FIG. 7 schematically shows two portions of web material N in the first and in the second position of the feeding path. More particularly, the web material in the first position is represented by a continuous line, while the web material in the second position is represented by a dotted line. Because of the traction applied to the web material, for example due to the different feeding speed in the two positions, the web material is elongated longitudinally and shrinks transversely, as schematically indicated in FIG. 7.

The Poisson's ratio is given by the following formula:

$$CP = \frac{\frac{-\Delta L2}{L2}}{\frac{\Delta L1}{L1}}$$

where L1 and L2 are the length (dimension in machine direction MD) and the width (dimension in transverse direction CD) of the web material N in the first position. The values ΔL1 and ΔL2 are the length and width variations due to the traction, to which the web material is subjected in the portion between the two positions.

Based on the kinematic formulas correlating speed and length of the web material, the following formula is easily obtained, defining the Poisson's ratio CP:

$$CP = \frac{\frac{L2b - L2a}{L2a}}{\frac{V1b - V1a}{V1a}}$$

Where (see also FIG. 7):

L2a is the web material width detected by the first device to acquire information on the width of the web material, L2b is the web material width detected by the second device to acquire information on the width of the web material, V1a is the feeding speed of the web material in the first position, V1b is the feeding speed of the web material in the second position.

In the above description, specific reference has been made to a slitter-rewinder comprising a winding station, to which a series of strips of web material are fed, obtained by longitudinal cutting a web material from a primary reel unwound in an unwinding machine. Some of the features described above can also be used in a winding machine receiving a continuous web material directly from a manufacturing machine, for example a continuous paper production machine or a machine for producing a non-woven fabric.

FIG. 8 shows a diagram of a winding machine 100 of this type. The winder 100 comprises a winding station 101, for example adapted to receive secondary winding cores that are adjacent to, and coaxial with, one another. In this embodiment again, as in the previous case, the winding cores can be inserted onto an expandable winding rod or shaft. The winding machine 100 also comprises a cutting device 104 with a plurality of blades 105 and one or more counter-blades 107. The cutting device 104 is arranged upstream of the winding station with respect to the feeding direction of the web material N along a feeding path P, and is configured to slit the web material N into a plurality of strips S1-Sn.

The winding station 101 can comprise a winding roller 103, around which the strips of web material coming from the cutting device 104 are driven. Guide rollers 109, 111, 113, 114, and 115 may be arranged along the feeding path P of the web material N, both upstream and downstream of the cutting device 104.

In some embodiments, the winding machine 100 comprises a web material evaluation system. The evaluation system can comprise, for example, a metal detector 125, which has the same function as the metal detector 50 described with reference to FIG. 1. The metal detector can be provided along the portion of feeding path P between the guide rollers 114 and 115, advantageously downstream of the cutting device 104.

In addition or alternatively, the web material evaluation system can comprise one or more video cameras, as described with reference to FIGS. 1 to 3. In FIG. 8, two video cameras 121 and 122 are shown, so arranged as to frame the web material feeding path downstream of the cutting device 104 and advantageously as close as possible to the winding roller 103, for the same purposes and reasons described above. Respective lighting devices, schematically indicated with 123 and 124, are associated to the two video cameras 121, 122. The optical system comprising the video camera 121 and the lighting device 123 works in transparency, while the optical system comprising the video camera 122 and the lighting device 124 works in reflection. The number and arrangement of the video cameras are given just by way of example. In further embodiments, a greater number of video cameras or different positions thereof can be provided.

The video cameras can be fixed or movable, for example movable transversely with respect to the web material feeding path, i.e. orthogonally to FIG. 8. Furthermore, each video camera 121, 122 can be one of a group, or linear matrix, of video cameras, aligned transversely to the feeding path P.

The video cameras can be used to perform the functions described with reference to the previous embodiments, and in particular also for determining the Poisson's ratio, managing the neck-in of the web material and performing other functions described above. In addition to video cameras, the winding machine can also comprise devices for detecting the feeding speed of the web material and the position of the cutting blades, for example for calculating the Poisson's ratio.

The invention has been described with reference to various specific embodiments, but it will be clearly apparent to those skilled in the art that many modifications, changes and omissions are possible, without however departing from the scope of protection of the claims.

The invention claimed is:

1. A machine for winding a web material into a plurality of secondary reels, the machine comprising:
   a winding station, adapted to receive secondary winding cores coaxial with, and adjacent to, one another;
   a cutting device, with a plurality of blades, arranged upstream of the winding station with respect to the feeding direction of the web material and adapted to divide the web material into a plurality of strips of web material;
   a web material evaluation system; and
   a programmable unit for processing data collected by the web material evaluation system, wherein:
   the web material evaluation system is adapted to detect at least one of the following:
   the position of at least one longitudinal edge of the web material; the width of at least one strip of web material; and
   the programmable unit is configured to modulate at least one parameter of at least one feeding member of the web material as a function of the detection of the web material evaluation system.

2. The machine of claim 1, wherein the programmable unit is configured to modulate said at least one parameter to modulate the tension of the web material, or to prevent shifting of the web material in transversal direction.

3. The machine of claim 2, wherein said parameter is the speed of said at least one feeding member.

4. The machine of claim 1, wherein the web material evaluation system comprises a system for taking images of the web material.

5. The machine of claim 4, wherein the image taking system comprises at least one of the following combinations:
   a single camera adapted to frame a first face of the web material;
   a first camera adapted to frame a first face of the web material and a second camera adapted to frame a second face of the web material;
   a plurality of cameras adapted to frame a first face of the web material and a further camera, or a plurality of further cameras adapted to frame a second face of the web material.

6. The machine of claim 5, wherein to each camera a lighting device is associated for lighting a portion of web material framed by the camera; and wherein at least one camera and the respective lighting device are arranged at opposite sides of a feeding path of the web material, so that the camera captures transmitted images of the web material; and/or wherein at least one camera and the respective lighting device are arranged on the same side of the web material feeding path, so that the camera captures reflected images of the web material.

7. The machine of claim 1, wherein the web material evaluation system is arranged in an area of the web material feeding path comprised between the cutting device and the winding station.

8. The machine of claim 1, wherein the web material evaluation system comprises detection members for detecting a presence of metal residues in the web material.

9. The machine of claim 1, wherein said parameter is the speed of said at least one feeding member.

10. A method for winding a web material, comprising the following steps:
    feeding a web material along a feeding path towards a winding station, where a series of winding cores, coaxial with, and adjacent to, one another, are inserted;
    cutting the web material into a plurality of strips of web material along the feeding path;
    winding the strips of web material and forming therewith a plurality of secondary reels;
    detecting at least one of the following features of the web material: a position of at least one longitudinal edge of the web; and a width of at least one strip of web;
    modulating at least one web feeding member as a function of the detected feature;
    winding at least a first series of secondary reels, each formed by a strip of web material, on respective winding cores of a first series of winding cores arranged in the winding station; wherein the strips of web material are formed by cutting by means of a plurality of blades arranged in a first cut position;
    while winding the first series of secondary reels, detecting information on the position taken by the edges of the strips of web material and, based on said information, determining the actual width of the strips wound on the secondary reels of the first series and the reciprocal distance between adjacent strips;
    removing the first series of secondary reels from the winding station;
    according to the actual width of the strips and the reciprocal distance between the strips, repositioning the blades in a second cut position so as to take into account the transverse contraction of the strips of web material;
    positioning a second series of winding cores in the winding station, the cores of the second series being dimensioned and positioned according to the actual width of the strips and to the reciprocal distance between the strips; and
    winding a second series of secondary reels on the second series of winding cores.

11. The method of claim 10, wherein said at least one parameter is a speed of said at least one feeding member.

12. The method of claim 11, wherein the web material is unwound from a primary reel.

13. The method of claim 10, wherein the web material is unwound from a primary reel.

14. The method of claim 10, wherein the step of detecting at least one feature of the web material comprises the step of acquiring images of at least one face of the web material.

15. The method of claim 10, wherein said feature of the web material is detected in a portion of the feeding path downstream of a cutting device, which cuts the web material into strip of web material.

16. The method of claim 10, wherein the step of modulating said at least one web material feeding member comprises the step of reducing the feeding speed of the web material if the longitudinal edge of the web material is shifting laterally.

17. The method of claim 10, wherein the step of modulating at least one web feeding member comprises the step of modulating a tension of the web material according to the detected feature.

18. The method of claim 17, wherein the step of modulating the tension comprises the step of varying the feeding speed of the web material in at least one point of the feeding path.

\* \* \* \* \*